US010005139B2

(12) United States Patent
Williams et al.

(10) Patent No.: US 10,005,139 B2
(45) Date of Patent: Jun. 26, 2018

(54) PORTABLE MILLING TOOL WITH METHOD FOR TURBOMACHINE MILLING

(71) Applicant: General Electric Company, Schenectady, NY (US)

(72) Inventors: Bryan Edward Williams, Greenville, SC (US); Charles Van Buchan, Greer, SC (US); Andrew Joseph Colletti, Greenville, SC (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 14/976,776

(22) Filed: Dec. 21, 2015

(65) Prior Publication Data

US 2017/0173708 A1    Jun. 22, 2017

(51) Int. Cl.
*B23Q 9/02* (2006.01)
*B23C 1/20* (2006.01)
(Continued)

(52) U.S. Cl.
CPC .............. *B23C 1/20* (2013.01); *B23C 3/30* (2013.01); *B23P 6/045* (2013.01); *B23Q 9/0042* (2013.01); *F01D 5/005* (2013.01); *F01D 25/285* (2013.01); *F04D 29/322* (2013.01); *B23C 2215/52* (2013.01); *B23C 2220/366* (2013.01);
(Continued)

(58) Field of Classification Search
CPC .. B23Q 9/0014; B23Q 9/0007; B23Q 9/0042; B23Q 9/02; B23Q 9/0028; B23C 1/20; B23C 3/30; B23C 2215/04; B23C 2215/52; B23C 2215/56; Y10T 409/306328;
(Continued)

(56) References Cited

U.S. PATENT DOCUMENTS 3,596,558 A * 8/1971 Rydell ................ B23B 39/00
                                                  408/76
3,802,316 A * 4/1974 Bohm ................. B23C 1/20
                                                  409/133

(Continued)

FOREIGN PATENT DOCUMENTS

DE         2749287 A1 *  5/1979  ............... B23C 1/20
DE        19938569 A1    4/2001
(Continued)

*Primary Examiner* — Ryan Rufo
(74) *Attorney, Agent, or Firm* — Ernest G. Cusick; Hoffman Warnick LLC

(57) ABSTRACT

Embodiments of the present disclosure include portable milling tools and methods for milling components. In an embodiment, a portable milling tool can be provided for a component including a plurality of dovetail slots therein, each of the plurality of dovetail slots being oriented substantially axially relative to a rotation axis of the component. The portable milling tool can include: a mounting plate configured to engage the component; a tool-aligning member slidably coupled to the mounting plate and extending along a chordal axis relative to the rotation axis of the component; and a milling head extending axially from the tool-aligning member to a selected one of the plurality of dovetail slots, such that sliding movement of the tool-aligning member relative to the mounting plate moves the milling head along the chordal axis to contact a selected one of the plurality of dovetail slots.

12 Claims, 9 Drawing Sheets

(51) Int. Cl.
*B23C 3/30* (2006.01)
*B23P 6/04* (2006.01)
*F04D 29/32* (2006.01)
*F01D 5/00* (2006.01)
*F01D 25/28* (2006.01)
*B23Q 9/00* (2006.01)

(52) U.S. Cl.
CPC .............. *B23Q 9/0014* (2013.01); *B23Q 9/02* (2013.01); *F05D 2220/31* (2013.01); *F05D 2220/32* (2013.01); *F05D 2230/10* (2013.01); *Y10T 409/306216* (2015.01); *Y10T 409/306384* (2015.01)

(58) Field of Classification Search
CPC . Y10T 409/306384; Y10T 409/306216; F01D 5/005; F01D 5/02
See application file for complete search history.

(56) References Cited

U.S. PATENT DOCUMENTS

| | | | |
|---|---|---|---|
| 4,100,388 A | 7/1978 | Meyer | |
| 4,256,555 A | 3/1981 | Wilson et al. | |
| 4,468,304 A | 8/1984 | Hill | |
| 4,761,104 A | 8/1988 | Hillestad | |
| 4,987,700 A * | 1/1991 | Westerman | B23Q 9/0014 451/127 |
| 5,032,051 A * | 7/1991 | Gilmore | B23C 1/20 33/293 |
| 5,123,790 A * | 6/1992 | King | B23C 1/20 408/76 |
| 5,149,405 A | 9/1992 | Bruns et al. | |
| 5,161,291 A * | 11/1992 | Guenther | B23C 3/00 29/56.5 |
| 5,284,406 A | 2/1994 | Mueller et al. | |
| 5,527,435 A | 6/1996 | Arnau | |
| 5,533,845 A | 7/1996 | Glover | |
| 5,667,000 A * | 9/1997 | Bean | B23Q 9/0014 144/136.7 |
| 6,290,461 B1 | 9/2001 | Wei et al. | |
| 6,296,172 B1 | 10/2001 | Miller | |
| 6,419,426 B1 | 7/2002 | Chalupa et al. | |
| 6,540,455 B1 * | 4/2003 | Speranza | B23C 3/34 409/132 |
| 6,551,032 B1 | 4/2003 | Nolan et al. | |
| 6,652,369 B2 | 11/2003 | Jones et al. | |
| 6,767,168 B2 | 7/2004 | Miller | |
| 6,830,240 B2 | 12/2004 | Jones et al. | |
| 6,846,227 B2 | 1/2005 | Sato et al. | |
| 7,211,178 B2 | 5/2007 | Schreiber | |
| 7,309,215 B2 | 12/2007 | Negulescu | |
| 7,476,085 B2 | 1/2009 | Mohr et al. | |
| 7,699,685 B1 | 4/2010 | Gerstner | |
| 7,938,951 B2 | 5/2011 | Lee et al. | |
| 8,016,565 B2 | 9/2011 | Berg et al. | |
| 8,034,228 B2 | 10/2011 | Bayer et al. | |
| 8,151,458 B2 | 4/2012 | Hlavaty et al. | |
| 8,161,641 B2 | 4/2012 | Lamphere et al. | |
| 8,187,451 B2 | 5/2012 | Bayer et al. | |
| 8,262,897 B2 | 9/2012 | Bayer et al. | |
| 8,291,557 B2 | 10/2012 | Powers et al. | |
| 8,402,625 B2 | 3/2013 | Holmes et al. | |
| 8,540,861 B2 | 9/2013 | Bayer et al. | |
| 8,713,775 B2 | 5/2014 | Zhang et al. | |
| 8,778,147 B2 | 7/2014 | Wei et al. | |
| 2004/0234352 A1 * | 11/2004 | Vanderpol | B23C 3/122 409/178 |
| 2005/0198821 A1 * | 9/2005 | Reville | B23C 1/20 29/889.1 |
| 2007/0158389 A1 | 7/2007 | Rose | |
| 2012/0269592 A1 * | 10/2012 | Holmes | F01D 5/005 408/103 |
| 2014/0034512 A1 | 2/2014 | Holmes et al. | |
| 2014/0034513 A1 | 2/2014 | Holmes et al. | |
| 2014/0223709 A1 | 8/2014 | Clark et al. | |

FOREIGN PATENT DOCUMENTS

| | | | |
|---|---|---|---|
| DE | 102008000480 A1 * | 9/2009 | .............. B23C 3/30 |
| DE | 102010039594 A1 * | 2/2012 | .............. B23C 3/02 |
| FR | 2538726 A1 * | 7/1984 | .......... B23Q 9/0014 |
| FR | 2866585 A1 * | 8/2005 | .............. B23Q 9/02 |
| JP | H07266118 A | 10/1995 | |
| WO | WO 2013/178452 A1 * | 12/2003 | .............. B23Q 9/02 |

* cited by examiner

PORTABLE MILLING TOOL WITH METHOD FOR TURBOMACHINE MILLING

BACKGROUND

The disclosure relates generally to the milling of components, and more specifically includes portable milling tools and methods of milling a rotor-mounted turbomachine component.

Large industrial machines, such as turbomachines, can include a wide variety of large, expensive parts that are stressed during operation. In order to reduce the costs of operating the industrial machines, it is advantageous to extend the lifespan of these parts for as long as safely possible. In order to extend the lifespan of parts, stress relief techniques may applied to create a less stress-inducing structure, e.g., a cut recess with less-sharp corners that may exhibit increased stress. Stress relief techniques may also be advantageous to apply to extend the lifespan of parts already in use in the field.

Turbines include a number of large blades that are coupled to a rotor using slots in the rotor, i.e., mating dovetail connections. During operation, the blades rotate with the rotor as a fluid is forced across the blades, or the blades are forcibly turned to move the fluid. During operation, the blade and rotor connections can be stressed. For example, an end face of the rotor slot, oftentimes a dovetail shape, may include a cooling channel flange that creates a cooling channel at the end face of the slot. A corner at which the flange integrally couples to the end face of the slot may observe high stresses. In order to provide safe operation due to the various stresses, a rotor wheel may be scrapped after, for example, 100,000 hours. Since replacement of a rotor wheel is extremely costly, whatever stress reducing techniques are possible to extend the lifespan of the disk are ideally implemented during manufacturing. However, in some instances, it is possible to apply stress-relieving revisions to a rotor in the field to provide additional stress reduction.

Providing stress reducing techniques to rotors in the field, however, presents a number of challenges. The geometrical profile of a dovetail slot can vary widely from turbomachine to turbomachine, and from wheel to wheel within a single turbomachine. Some dovetail slots may include, for example, two or more sidewalls which meet at an acute angle to form a sharp sidewall region. In some cases, the material composition of a wheel may experience wear following extended use of the turbomachine. The dovetail slots of a wheel may be difficult to access or repair with conventional tools or repair techniques. Some specially-equipped machining shops may be capable of performing sophisticated repairs in these areas of the component. However, this approach may be costly in situations where a turbomachine is remote from the location of a machining shop.

SUMMARY

A first aspect of the disclosure provides a portable milling tool for a component including a plurality of dovetail slots therein, each of the plurality of dovetail slots being oriented substantially axially relative to a rotation axis of the component, the portable milling tool including: a mounting plate configured to engage the component; a tool-aligning member slidably coupled to the mounting plate and extending along a chordal axis relative to the rotation axis of the component; and a milling head extending axially from the tool-aligning member to a selected one of the plurality of dovetail slots, such that sliding movement of the tool-aligning member relative to the mounting plate moves the milling head along the chordal axis to contact a selected one of the plurality of dovetail slots.

A second aspect of the disclosure provides a method for milling a component including a plurality of dovetail slots therein, each of the plurality of dovetail slots being oriented substantially axially relative to a rotation axis of the component, the method including: engaging a mounting plate of a milling tool to a component; moving an axially-extending milling head of the milling tool along a chordal axis, relative to the rotation axis of the component, toward a selected one of the plurality of dovetail slots to contact the component with a milling head of the milling tool; and milling the component with the milling head of the milling tool to form a channel within the component between the selected one of the plurality of dovetail slots and an exterior surface of the component.

A third aspect of the invention provides a portable milling tool for a component including a plurality of dovetail slots therein, each of the plurality of dovetail slots being oriented substantially axially relative to a rotation axis of the component, the portable milling tool including: a mounting plate configured to engage the component; a brace coupled to the mounting plate and extending along a chordal axis relative to the rotation axis of the component; a tool-aligning member slidably coupled to the mounting plate and oriented along the chordal axis relative to the rotation axis of the component; and a milling head extending axially from the tool-aligning member to a selected one of the plurality of dovetail slots, such that sliding movement of the tool-aligning member relative to the mounting plate moves the milling head along the chordal axis to contact a sidewall region of the selected one of the plurality of dovetail slots, wherein the sidewall region includes a corner between two sidewalls of the selected one of the plurality of dovetail slots, the two sidewalls intersecting at a substantially acute angle.

BRIEF DESCRIPTION OF THE DRAWINGS

These and other features of the disclosed system will be more readily understood from the following detailed description of the various aspects of the system taken in conjunction with the accompanying drawings that depict various embodiments, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

The present disclosure relates to portable milling tools and methods of milling a component such as a rotor-mounted wheel. As used herein, the term "milling" or variants thereof refers to a process of grinding, working, treating, and/or otherwise shaping a rigid component by application of a milling head for accomplishing the same. Examples of a milling head can include without limitation: a rotating spindle, a boring head, a cutting element, a grinder, and/or one or more currently known or later developed instruments for milling a workpiece. In addition, the term "components" and variants thereof can include any and all rotor-mounted mechanical components such as those used in turbomachines, e.g., gas turbines, steam turbines, water turbines, etc.

Embodiments of the present disclosure can provide for milling of a component which includes a plurality of dovetail slots, oriented substantially axially relative to a rotation axis of the component. A portable milling tool according to the present disclosure can include, e.g., a mounting plate which slidably engages the component at an axial surface, circumferential face, and/or one or more dovetail slots of the component. A tool-aligning member can be coupled to the mounting plate to align a milling head of the portable milling tool with a selected dovetail slot in the component. The tool-aligning member can be oriented along a linear, chordal axis relative to a rotor axis of the turbomachine, thereby allowing the milling head to move linearly along a path aligning with the directional orientation of the tool-alignment member. Through this position and alignment, the milling head can selectively contact and mill portions of the component positioned proximal to the selected dovetail slot, such as those of an axial protrusion from a remainder of the component. The present disclosure also provides methods of milling a component, e.g., by contacting and milling a sidewall of a dovetail slot with a milling tool engaged to a component.

Figure 1:
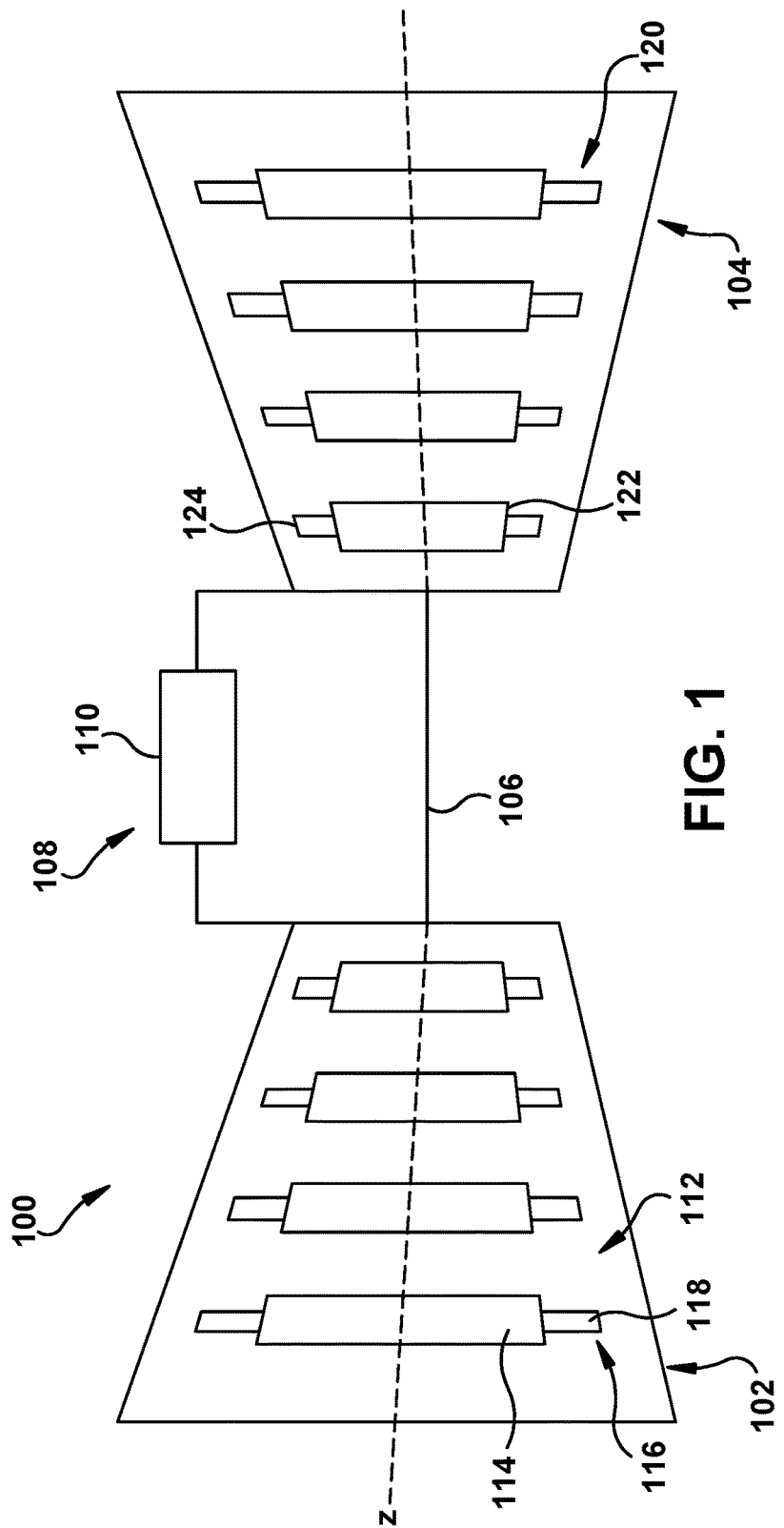
FIG. 1 is a schematic view of a conventional turbomachine system.

FIG. 1 shows a conventional turbomachine 100 that includes a compressor portion 102 operatively coupled to a turbine portion 104 through a common compressor/turbine shaft 106. As used herein, the terms "axial" and/or "axially" refer to the relative position/direction of objects along rotor axis Z, which extends substantially along or in parallel with the axis of rotation of the turbomachine (in particular, the rotor section). The terms "radial" and/or "radially" refer to the relative position/direction of objects along a direction R (FIGS. 2-7) extending outward from rotor axis Z, and substantially perpendicular to rotor axis Z. Additionally, the terms "circumferential" and/or "circumferentially" refer to the relative position/direction of objects along a circumference which surround a particular axis but do not intersect the same axis at any location. As is explained in further detail herein, the terms "chordal axis" or a "chordal" movement refer to movement along a linear path connecting two circumferential points of a two-dimensional, circumferentially-defined region, but without crossing the center of the two-dimensional, circumferentially-defined region at any location.

Compressor portion 102 can be fluidically connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include a first stage compressor rotor wheel 114 having a plurality of first stage compressor rotor blades 116 each having an associated airfoil portion 118. Similarly, turbine portion 104 includes a plurality of turbine rotor wheels 120 including a first stage turbine wheel 122 having a plurality of first stage turbine rotor blades 124. In accordance with an exemplary embodiment, one or more rotor wheels 112, 114, 120, 122 can be machined by the implementation of portable milling devices and/or milling techniques. It will be understood, however, that other components of turbomachine 100, and/or similar components within other turbomachine systems, can also be machined with one or more portable milling tools discussed herein, or otherwise subjected to embodiments of the processes described herein.

Figure 2:
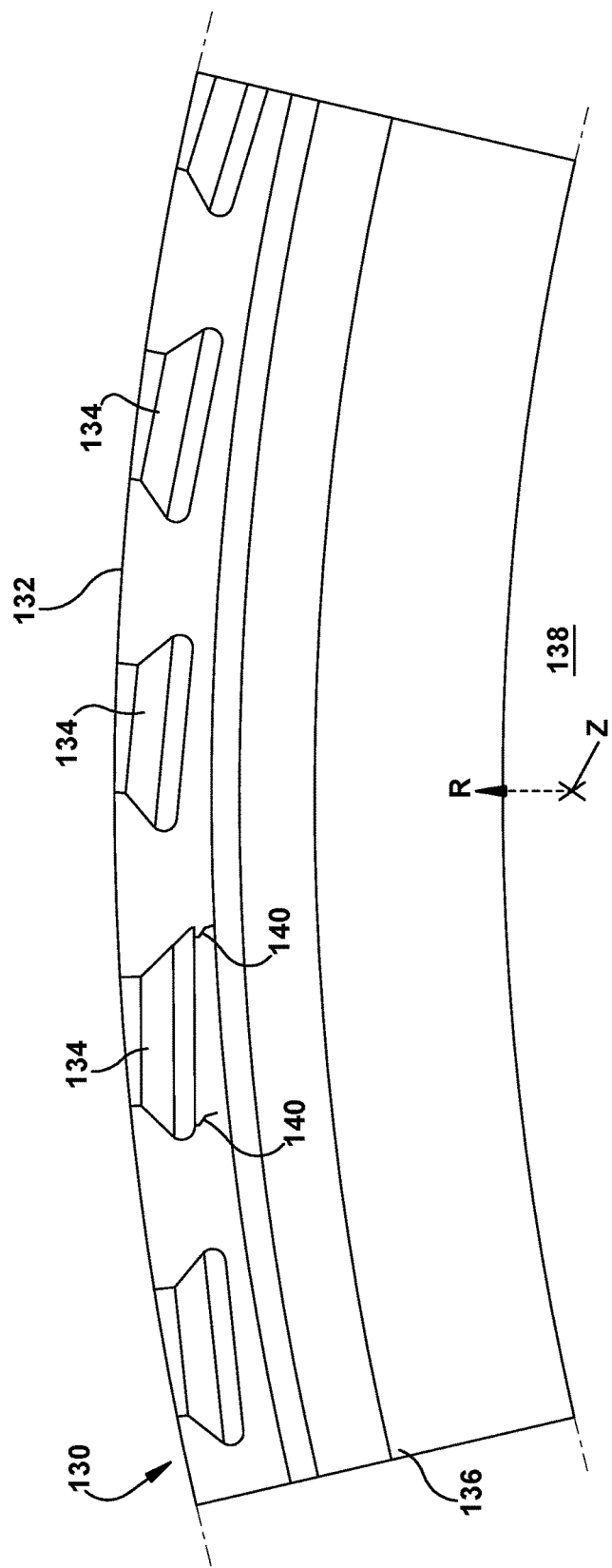
FIG. 2 is a partial side view of a component to be milled according to embodiments of the present disclosure.

Referring to FIG. 2, a partial side view of a component 130 adapted to be mounted upon rotor 106 (FIG. 1) is shown. Rotor axis Z is shown to extend into or out of the plane of the page, with radial axis R extending outwardly therefrom. Although an arcuate section of component 130 is shown in FIG. 2, it is understood that component 130 can be substantially rounded as discussed herein. Component 130 can be provided in the form of any component configured for mounting on rotor 106 of a turbomachine system such as turbomachine 100. In an example embodiment, component 130 can be an embodiment of compressor rotor wheel 114 configured to receive compressor rotor blades 116. More specifically, component 130 can be provided in the form of, e.g., one or more compressor wheel(s) 112, 114 (FIG. 1), one or more turbine wheels 120, 122 (FIG. 1), or other rotor-mounted components of turbomachine 100 (FIG. 1).

Regardless of embodiment or implementation, component 130 can be embodied as any currently known or later developed substantially arcuate component, having a circumferential face 132 with a plurality of dovetail slots 134 therein. Dovetail slots 134 may be located in any wheel of turbomachine 100. As understood, dovetail slots 134 are circumferentially spaced about a wheel or disk. Each dovetail slot 134 may take the form of any blade-to-rotor mounting element now known or later developed. In the examples illustrated, each dovetail slot 134 includes a complex dovetail configuration; however, simpler arrangements are possible. In some instances, the geometry of dovetail slot 134 may include a substantially flat (i.e., neither substantially concave nor substantially convex) radial face of body 136 therein. Each dovetail slot 134 can be shaped and adapted to receive a dovetail portion of a blade component such as, e.g., compressor rotor blades 116 (FIG. 1) and/or turbine rotor blades 124 (FIG. 1). In addition, dovetail slots 134 can extend radially and axially relative to rotor axis Z.

A body 136 of component 130 can be positioned radially inward of circumferential face 132 and dovetail slots 134, such that body 136 is positioned circumferentially about rotor axis Z (extending out of the page in FIG. 2). Component 130 can include an aperture 138 for axially receiving rotor 106 therein. In some cases, extended use of component 130 within turbomachine 100 can cause cracks 140 to form within body 136, adjacent to the interior sidewalls of dovetail slot 134. More specifically, cracks may form in response to mechanical stress imparted against sidewall regions of dovetail slots 134. Embodiments of the present disclosure provide devices and methods for removing cracks 140 and/or other portions of body 136 from component 130. As will be described herein, portable milling tool 200 (FIGS. 3-5, 7) may be employed to relieve stress and/or cracks 140 in regions adjacent to dovetail slots 134 of, for example, first stage compressor rotor wheel 122 (FIG. 1). More specifically, embodiments of portable milling tool 200 can facilitate an in-field or in-situ removal and repair of a high stress portion of component 130 including, e.g., one or more cracks 140. Although the teachings of the invention will be described relative to the particular setting of removing cracks 140, it is emphasized that portable milling tool 200 and the teachings of the invention may be employed for a large number of other portions of component 130 and/or dovetail slots 134. For example, other portions of dovetail slot 134 may include portions of the dovetail, a base portion of a dovetail of a blade, etc.

Figure 3:
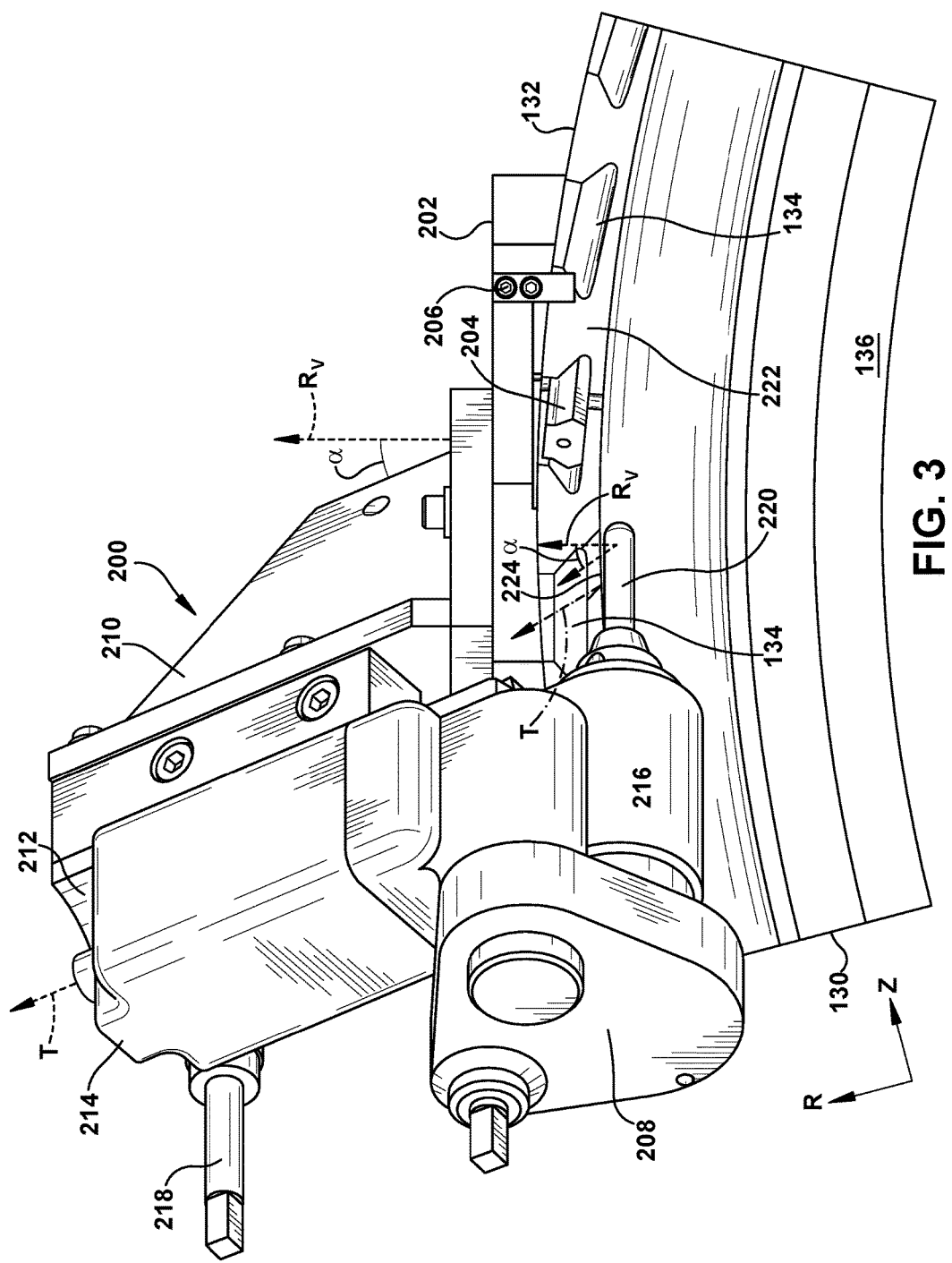
FIG. 3 is a perspective view of a portable milling tool and component according to embodiments of the present disclosure.
Figure 4:
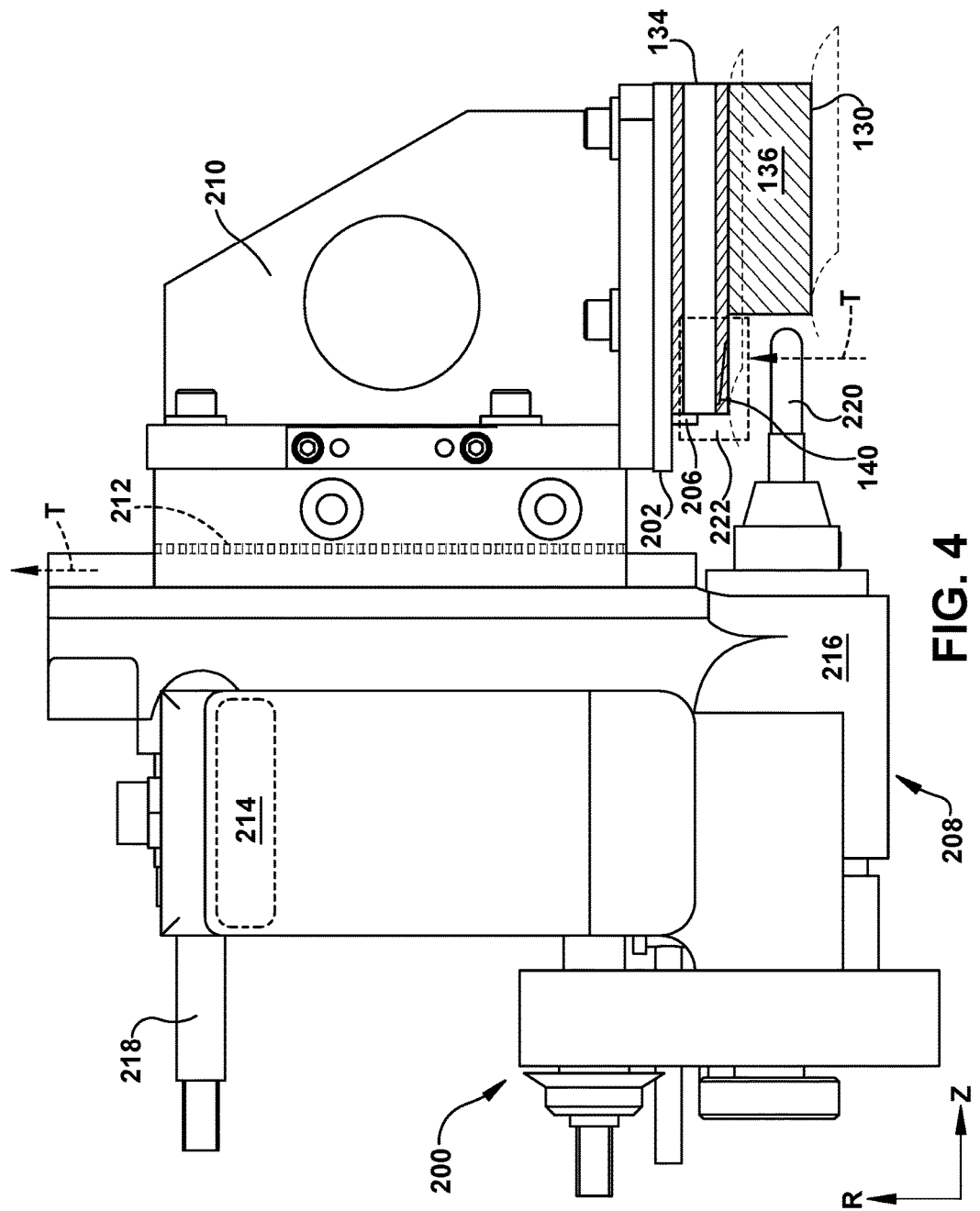
FIG. 4 is a side view of a portable milling tool with a cross-section of a component according to embodiments of the present disclosure.

Referring to FIGS. 3 and 4 together, a portable milling tool 200 for use with component 130 according to embodiments of the present disclosure is shown. In the perspective view of FIG. 3, rotor axis Z is shown to extend both rightward and into the plane of the page, with radial axis R being oriented perpendicularly outward from rotor axis Z. Portable milling tool 200 is illustrated as being positioned adjacent to circumferential face 132 of component 130, i.e., a rotor wheel or disk of the rotor, having a plurality of dovetail slots 134 therein. FIG. 4 shows a side view of portable milling tool 200 in addition to a partial cross-sectional view of component 130. Phantom arcs are shown to extend circumferentially from component 130 in FIG. 3, and cut-away portions of component 130 are indicated with cross-hatching. As illustrated, component 130 is still positioned within turbomachine 100 (FIG. 1). That is, portable milling tool 200 can be mounted to turbomachine 100 in-situ and without having component 130 removed. In this fashion, portable milling tool 200 can operate to remove cracks 140 from component 130 without the time and expense of removal and/or transport to a machine shop. As illustrated, component 130 has any surrounding nozzles, casings, etc., removed and has also had its blades removed. Consequently, component 130 is exposed and readily accessible for repair work in-situ. However, it is also understood that embodiments of portable milling tool 200 can also be used with components 130 that have been removed from turbomachine 100.

Portable milling tool 200 can include a mounting plate 202 configured to be mounted on component 130, e.g., at circumferential face 132. Portions of mounting plate 202, for example, can slidably engage dovetail slots 134 not currently being machined, such that one selected dovetail slot 134 remains exposed without elements of mounting plate 202 being positioned therein. One or more fixtures (e.g., sliding dovetails 204 discussed elsewhere herein) can slidably engage and rest within dovetail slot(s) 134 adjacent to the selected dovetail slot to restrict or prevent circumferential motion of portable milling tool 200 relative to component 130. A planar surface of mounting plate 202, engaging component 130, can be oriented substantially in parallel with rotor axis Z. Sliding engagement between mounting plate 202 and component 130, e.g., through one or more fixtures, can prevent circumferential movement of portable milling tool 200 relative to component 130.

Figure 5:
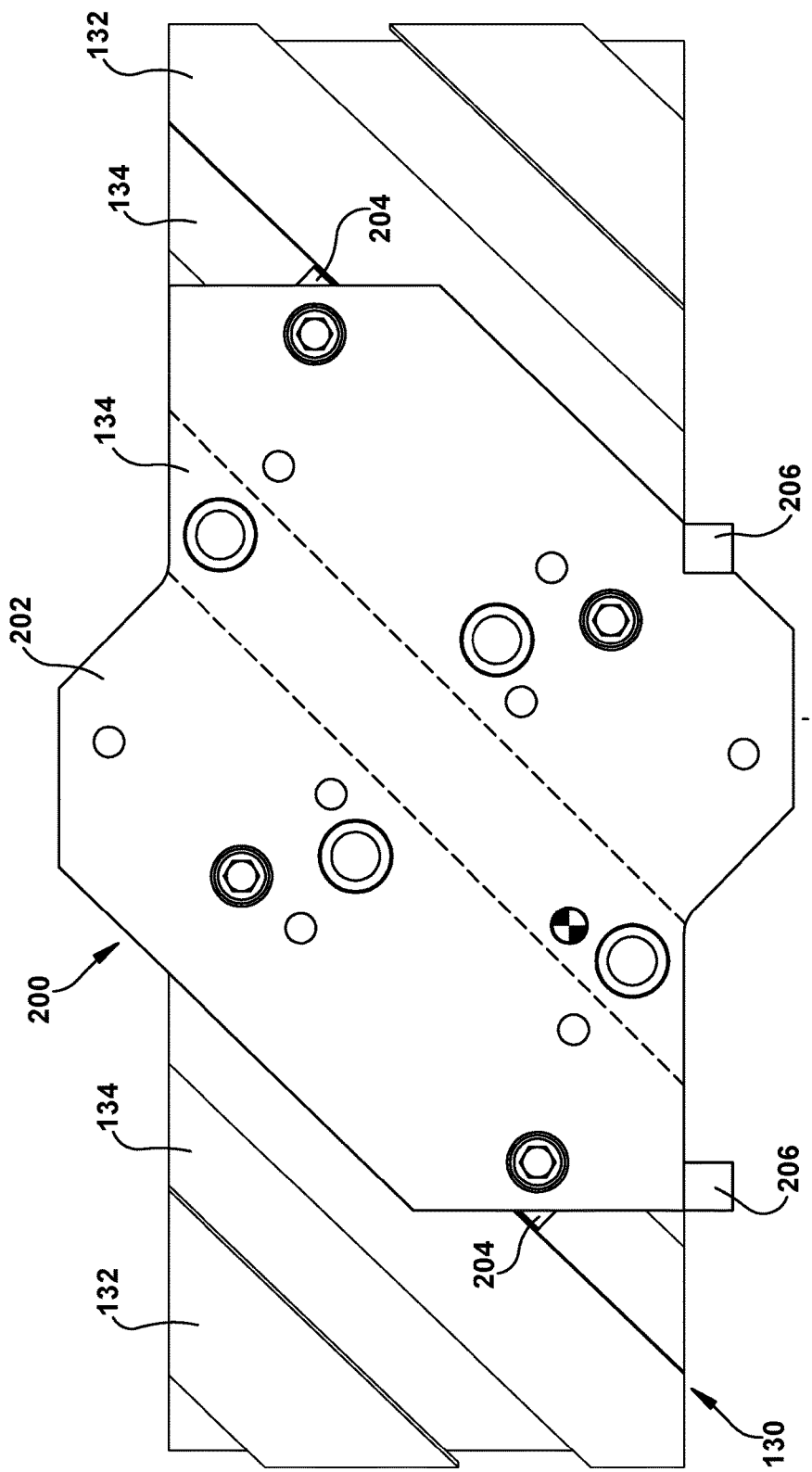
FIG. 5 is a plan view of a mounting plate of a portable milling tool engaged to a component according to embodiments of the present disclosure.

Referring to FIGS. 3 and 5 together, mounting plate 202 can engage component 130 with the aid of fixtures such as, e.g., sliding dovetails 204, and/or axial stops 206. Sliding dovetails 204, one type of fixture, can contact and extend substantially in parallel within dovetail slot(s) 134 adjacent to a selected dovetail slot(s) 134 (shown in phantom). The position of sliding dovetails 204 within dovetail slots 134 circumferentially adjacent to the selected dovetail slot 134 can substantially prevent circumferential movement of mounting plate 202 relative to component 130 during engagement therebetween. Each sliding dovetail 204 can be permitted to move axially within a corresponding dovetail slot 134, such that sliding dovetails 204 permit portable milling tool 200 to move axially into, out of, and within dovetail slots 134 during operation. Sliding dovetails 204 can thereby reduce or prevent circumferential slipping of portable milling tool 200 relative to component 130, e.g. as portable milling tool 200 operates on component 130 as described herein.

Axial stops 206, another type of fixture, can protrude perpendicularly from one or more axial ends of mounting plate 202. Axial stops 206 can contact a corresponding axial face of component 130 to prevent axial movement of mounting plate 202 relative to component 130 in at least one direction. Each axial stop 206 can be provided as a fixture to be used separately and/or in conjunction with sliding dovetails 204. The contact between axial stops 206 and the axial end of component 130 can allow portable milling tool 200 to remain in a desired axial position as other components of portable milling tool 200 operate on portions of component 130. The various fixtures described herein, e.g., sliding dovetails 204, axial stops 206 can be used together and/or separately, and can be modified based on a given embodiment of component 130.

Returning to FIGS. 3 and 4, portable milling tool 200 can include a tool-aligning member 208 mechanically coupled to mounting plate 202, e.g., by sliding engagement to a brace 210. Brace 210 can operatively couple tool-aligning member 208 to mounting plate 202. In an embodiment, brace 210 can be fixedly coupled to mounting plate 202. As illustrated, brace 210 may support and position tool-aligning member 208 and subcomponents thereof in a partially cantilevered fashion from an outer surface thereof. In one embodiment, brace 210 may include a block of machined aluminum or other structural metal, e.g., steel, stainless steel, etc., coupled to mounting plate 202. Brace 210 can extend from the surface of tool-aligning member 208 at an angle $\alpha$, relative to a vertical projection of radial axis R (denoted as "$R_v$") extending, e.g., outwardly from the selected dovetail slot 134.

A track 212 positioned on one surface of brace 210 can allow tool aligning member 208 to move linearly relative to brace 210 substantially along the direction noted with arrow "T." To provide linear translational movement of tool-aligning member 208 relative to mounting plate 202, track 212 can be embodied as, e.g., a sliding bearing, a rolling bearing, a toothed bearing, a threaded bearing etc. It is understood that, in embodiments where brace 210 is omitted, track 212 can be coupled directly to a portion of mounting plate 202. As is discussed in further detail herein, tool-aligning member 208 can be oriented substantially along a chordal axis relative to rotor axis Z (i.e., the center of a circumferential space). In some embodiments (e.g., as discussed relative to FIG. 5 herein), tool-aligning member 208 more specifically can extend linearly within the same plane as radial axis R, yet can be oriented along a reference line which does not cross the radial center of component 130 (i.e., the position of rotor axis Z). As is further discussed herein, the chordal axis of orientation for tool aligning member 208 can be approximately coincident with the direction of arrow "T," which can be oriented at angle α relative to vertical projection $R_v$ of radial axis R. Tool-aligning member 208 can generally be embodied as a mechanical fixture or housing for providing a mechanical coupling between mounting plate 202 and one or more operative components of portable milling tool 200, discussed elsewhere herein.

Where applicable, tool-aligning member 208 can include one or more drive systems, coupling components, power sources, etc., therein for driving and/or interacting with components used in the milling of component 130. For example, tool-aligning member 208 can also include an actuator 214 for providing movement of tool-aligning member 208 relative to brace 210, e.g., across track 212. Track 212 can slidably couple actuator 214 to brace 210, and actuator 214 can be coupled to and/or positioned within tool-aligning member 208 of portable milling tool 200. Actuator 214 can include any currently-known or later-developed device for slidably connecting tool-aligning member 208 to track 212, e.g., a fixed member or component for sliding across track 212, a rotatable surface for rolling, a grooved or threaded bearing or bearing surface, etc.

A drive system 216 can be operably coupled to actuator 214, and can allow a user to slidably position tool-aligning member 208 relative to mounting plate 202 and brace 210, via track 212, at any linear position desired along the direction of arrow T. Drive system 216 can be provided in the form of one or more means for converting one of various inputs (e.g., fuels, imparted motion, electricity, etc.) into output mechanical energy for operating actuator 214 or other mechanically powered components of portable milling tool 200. For example, drive system 216 can be provided in the form of any form of motor, e.g., pneumatic, hydraulic, electric, capable of providing a predetermined amount of movement. In any event, actuator 214 and drive system 216, together, can move tool-aligning member 208 linearly along arrow T, relative to brace 210 and component 130, within thousandths of an inch (approximately 0.0254 mm). In one particular example, actuator 214 and drive system 216 can be configured to advance milling head 220 approximately 3.175 millimeters radially toward or away from dovetail slot 134.

To allow a user to control the position and/or movement of portable milling tool 200, a grip 218 can be coupled to portable milling tool 200, e.g., by extending from a portion of tool-aligning member 208 directly or through intervening components. It is also understood that grip 218 can alternatively be coupled to other components of portable milling tool 200. In any event, grip 218 can be embodied as a mechanical fixture capable of being held by a user and/or separate mechanism for holding portable milling tool 200 in a particular position, and or allowing a user or separate machine to move tool-aligning member 208 and components thereof substantially along the direction of line T. Although grip 218 is shown to be fixed in FIGS. 3 and 4, it is understood that grip 218 can include various features to enable angular and/or positional adjustment of portable milling tool 200.

A milling head 220 can be coupled to tool-aligning member 208, projecting axially outward from an end of tool aligning member 208. Each dovetail slot 134 can be positioned, e.g., within an end axial region 222 of component 130 which protrudes axially from body 136. Milling head 220 can thereby be radially displaced from end axial region 222 of component 130, and the selected dovetail slot 134. Drive system 216 of portable milling tool 200 can transmit and/or produce mechanical power for operating milling head 220, e.g., by causing milling head 220 to rotate at a selected rotational speed (e.g., approximately ten-thousand revolutions per minute (rpm), forty-thousand rpm, etc.) capable of removing portions of component 130 during contact between milling head 220 and component 130 at end axial region 222.

Figure 6:
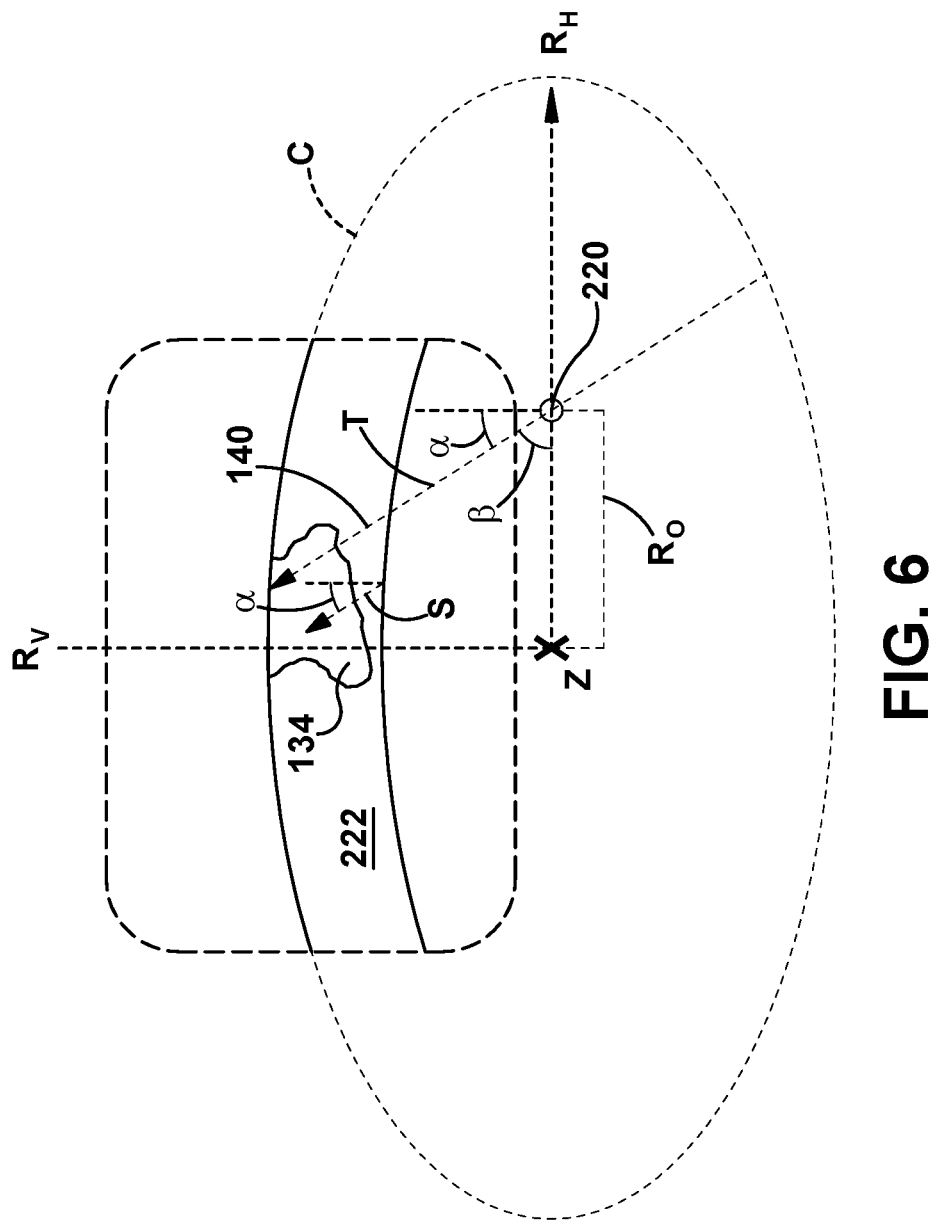
FIG. 6 shows a schematic grid of positioning of a portable milling tool according to embodiments of the present disclosure.

Referring to FIG. 6, a schematic diagram illustrating chordal linear movement of milling head 220 on tool-aligning member 208 (FIGS. 3-4) relative to a portion of component 130 is provided. A side view of an arcuate portion of end axial region 222 of component 130 is depicted as being within a rounded circumferential plane C. Component 130 is shown to be positioned within a circumferential plane C, coincident with the plane of the page. Rotor axis Z is shown to extend axially into the plane of the page, with radial axis R extending outwardly therefrom. A horizontal projection $R_H$ extends horizontally relative to rotor axis Z, while vertical projection $R_v$ extends vertically relative to rotor axis Z. As shown, milling head 220 of tool-aligning member 208 may be oriented to move linearly along a direction T at predetermined angle α relative to vertical projection $R_v$ of radial axis R, and at another angle β relative to horizontal projection $R_H$ within circumferential plane C. Direction T can extend along a chordal axis relative to rotor axis R, such that direction T extends between two circumferential points of plane C without passing through rotor axis R. For the example of turbomachine 100 (FIG. 1), angle α between direction T and vertical projection $R_v$ may be between approximately 30° to 50°, depending on the portion of turbomachine 100 where component 130 is used. To accommodate varied types of turbomachines 100 and components therein, varying types of braces 210 (FIGS. 3-4) with different angular orientations α may be employed so that portable milling tool 200 (FIGS. 3-4) can be used with a wide variety of turbomachines 100. For example, the selected angular orientation α can mimic an angular orientation S of dovetail slots 134 relative to vertical projection $R_v$, which may also extend at approximately angle α relative to vertical projection $R_v$.

As noted herein, direction T is shown to extend in a linearly along a chordal axis within circumferential plane C, relative to rotor axis Z. The path of milling head 220 along direction T can thus intersect horizontal projection $R_H$ at a location offset from rotor axis Z by a horizontal offset distance $R_O$ which can be, e.g., between approximately 0.50 millimeters (mm) and 2.0 mm. The amount of horizontal offset distance $R_O$ between rotor axis Z and the position of milling head 220 within horizontal plane H can vary between turbomachines and machining processes. The movement of milling head 220 along direction T can within circumferential plane C can be coincident with a chordal axis relative to rotor axis Z as discussed herein. As is also shown in FIG. 5, crack(s) 140 can be positioned within end axial region 222 within the path of direction T, such that linear movement of milling head 220 along a chordal axis can pass through crack(s) 140 within component 130.

Figure 7:
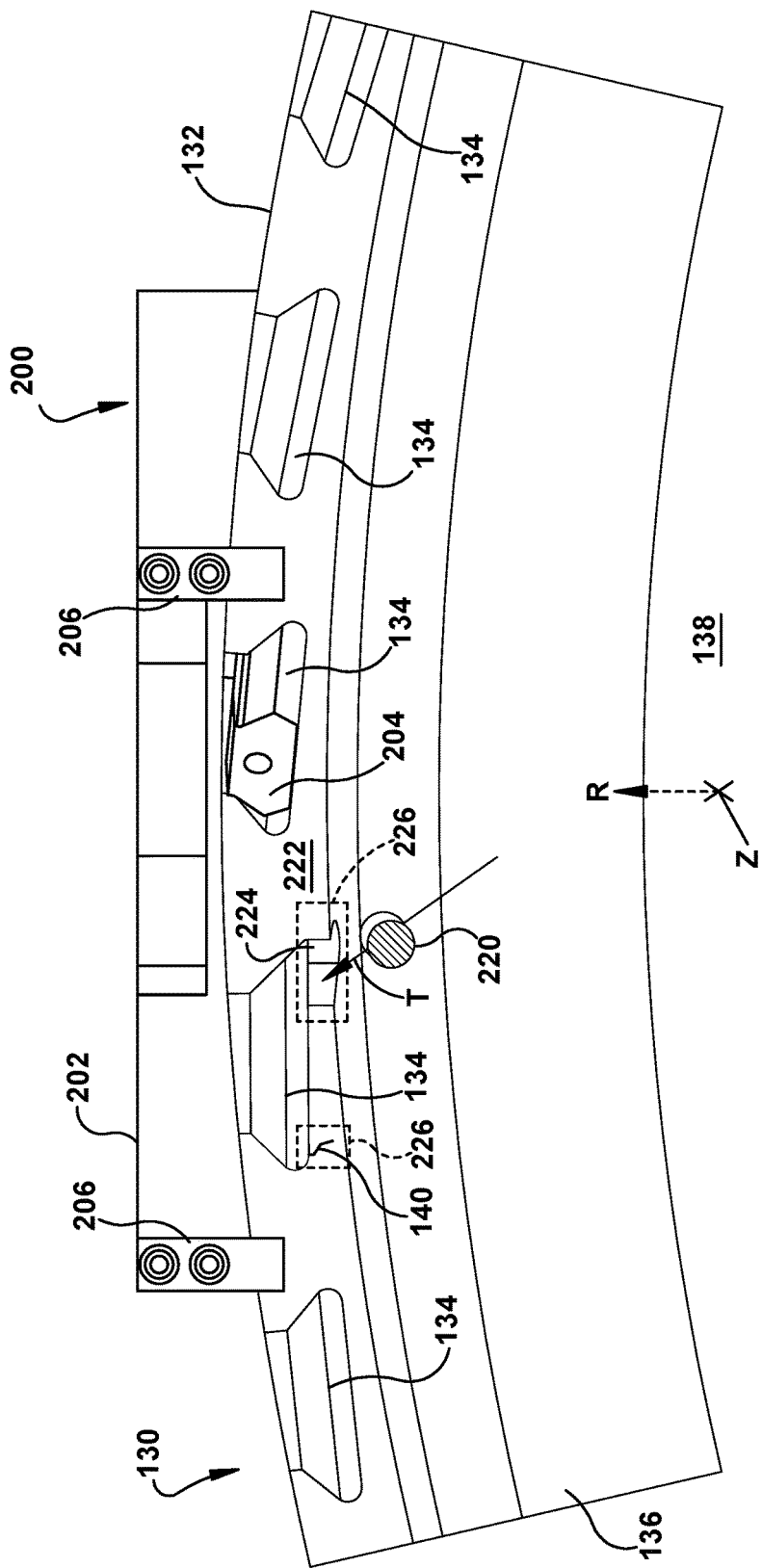
FIG. 7 is a partial side view of a component being milled according to embodiments of the present disclosure.

Referring now to FIG. 7, an embodiment of component 130 undergoing a milling process with portable milling tool 200 is shown. Other components of portable milling tool 200 (e.g., tool-aligning member 208 and brace 210) are omitted from FIG. 7 solely to clarify operating features of milling head 220 with component 130. Milling head 220 can be oriented in the same direction as rotor axis Z, and thus is shown in cross-hatching as extending out of the plane of the page. Before milling component 130 according to embodiments of the present disclosure, a user of portable milling tool 200 can mount mounting plate 202 on component 130, e.g., by way of one or more fixtures described herein such as sliding dovetails 216 and/or axial stops 218. More specifically, a user can affix portable milling tool 200 to a selected area of component 130. Fixtures such as sliding dovetails 216 and/or axial stops 218 can affix portable milling tool 200 by reducing or preventing slipping motion relative to component 130 as discussed elsewhere herein. In any event, the engagement between mounting plate 202 and component 130 can position milling head 220 distal to selected dovetail slot 134, e.g., along the path of direction T. Movement of tool-aligning member 208 (FIGS. 3-4) along direction T can thereby also bring milling head 220 into contact with end axial region 222 of component 130.

During operation, actuator 214 (FIGS. 3-4) and drive system 216 (FIGS. 3-4) of portable milling tool 200 can bring milling head 220 into contact with an end axial region 222 to form a chordal channel 224 within and/or adjacent to one or more dovetail slots 134. More specifically, chordal channel 224 can pass through a sidewall region 226 of selected dovetail slot(s) 134. Each sidewall region 222 of dovetail slot 134 can be defined as a location where two sidewalls of dovetail slot 134 intersect with each other at a substantially acute angle (i.e., an angular orientation of between approximately 0° and 90°). Such regions may be subject to wear and/or cracking after long-term use of component 130, e.g., as shown via cracks 140. To form chordal channel 224, drive system 216 (FIGS. 3-4) can cause milling head 220 to rotate, vibrate, and/or otherwise move at a predetermined speed to allow the selective milling of component 130 by milling head 220 within end axial region 222. Movement of the driven milling head 220 against component can cause material to be removed from component 130, to allow milling head 220 to remove portions of end axial region 222 and form chordal channel 224. The forming of chordal channel 224 can also remove cracks 140 from component 130.

Figure 8:
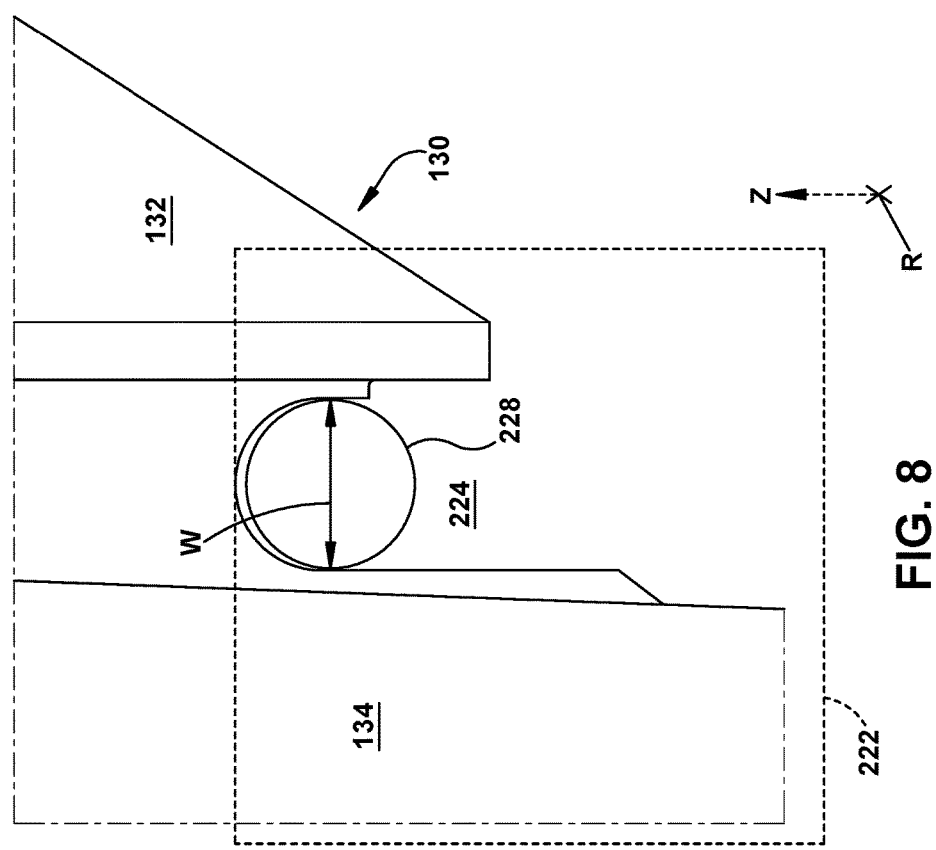
FIG. 8 is a partial cross-sectional view of a milled component according to embodiments of the present disclosure.

Referring to FIGS. 7 and 8 together, embodiments of the present disclosure can repair the structural composition of component 130 and/or remove defects such as cracks 140 (FIG. 2). For example, milling head 220 of portable milling tool 200 can mill portions of component 130 where cracks 140 have already formed or may be predicted to form. Forming chordal channel 224 with milling tool 208 can additionally remove a portion of component 130 outside the location of crack 140 (FIG. 2) or sidewall region 226, and can create an additional space adjacent to dovetail slot(s) 134. Chordal channel 224 can impede or prevent the forming of additional cracks by reducing the contact area between a blade and the internal structure of component 130. In an example embodiment, the formed chordal channel(s) 224 can be formed at sidewall regions 226 where two faces of body 136 intersect, e.g., at an acute angle.

As shown in FIG. 8, where radial axis R extends into and out of the plane of the page, chordal channel 224 can have an associated width W, which may be equal to or greater than a width dimension of milling head 220 (FIGS. 3, 4, 7). Where chordal channel 224 is specified to have a predetermined size, embodiments of the present disclosure can include calibrating the size of chordal channel 224 with an additional instrument or component. For example, a user can insert a calibrating element 228, which can be embodied as a substantially rigid pole, dowel, or other member, through chordal channel 224. Calibrating element 228 can extend substantially along the same chordal axis as tool-aligning member 208 (FIGS. 3-4) and milling head 220 (FIGS. 3-4 and 7) to determine whether the width of chordal channel 224 meets predetermined requirements. For example, calibrating element 228 can be shaped to have a cross-sectional area equal to a desired cross-sectional area of chordal channel 224, such that calibrating element will not pass through chordal channel 224 in the event that chordal channel 224 is machined incorrectly.

Figure 9:
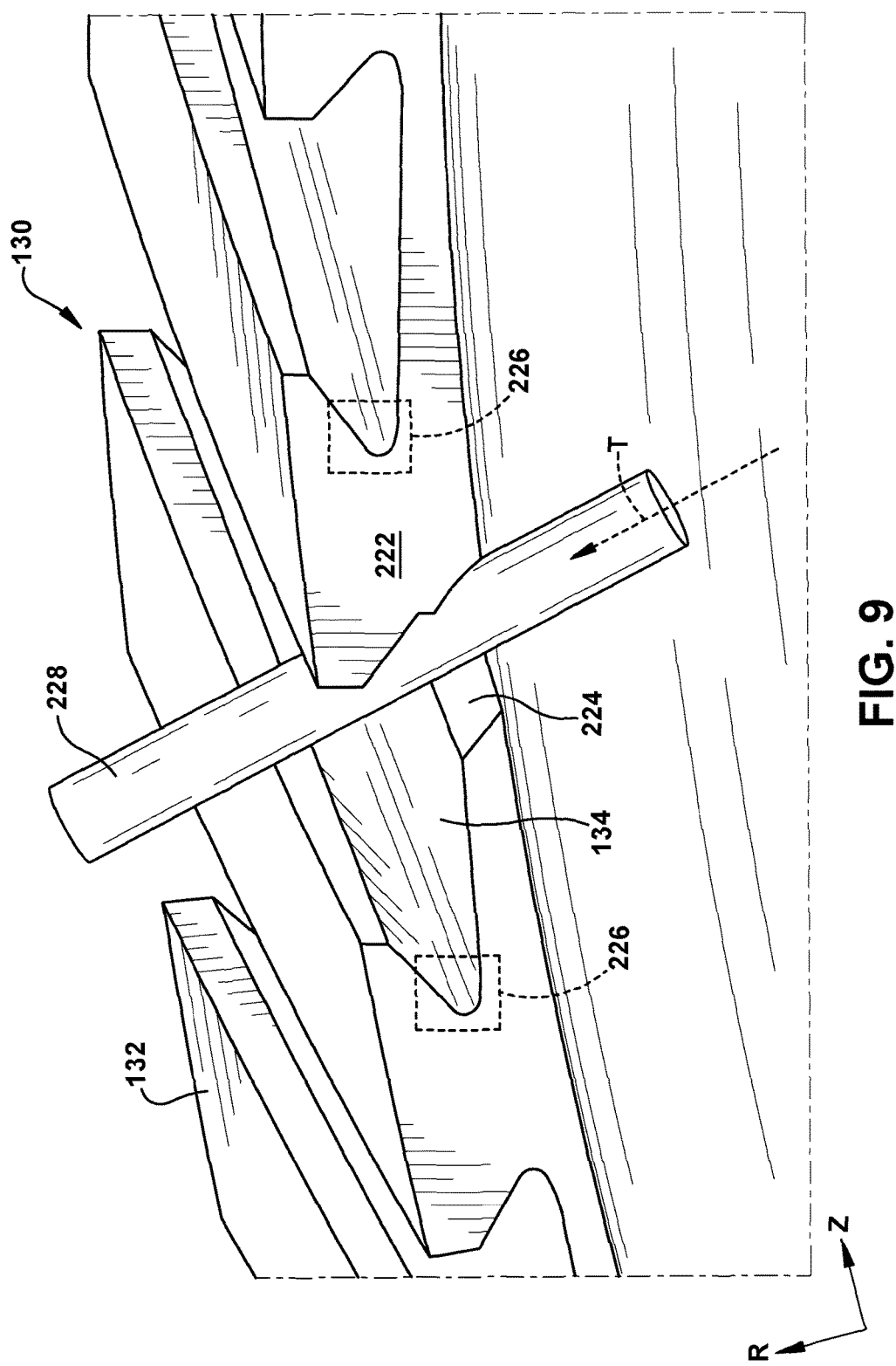
FIG. 9 is a perspective view of a milled component being inspected according to embodiments of the present disclosure.

Referring to FIG. 9, a perspective view of chordal channel 224 with calibrating element 228 positioned therein is shown to demonstrate calibration processes in embodiments of the present disclosure. Calibrating element 228 can be oriented, e.g., manually or with the aid of external components (not shown), to extend along direction T at angle α relative to vertical protection $R_v$ of radial axis R. The ability for calibrating element 228 to pass completely through channel 224 and out of a milled dovetail slot 134 at angle α, relative to vertical projection $R_v$ of radial axis R, can indicate that chordal channel 224 was formed to have at least a minimum desired width (i.e., width "W" in FIG. 8). Chordal channel 224 can also extend through a space adjacent to dovetail slot 134 where at least a portion of sidewall region 226 was previously located. Calibrating element 228 can visually indicate whether chordal channel 224 was formed correctly with milling tool 208 when inserted through chordal channel 224.

Embodiments of portable milling tool 200 and methods for milling component 130 according to the present disclosure can thus provide several commercial and technical advantages, some of which are discussed by way of example herein. For instance, the size of portable milling tool 200 can allow a user to form chordal channel(s) 224 and remove cracks 140 (FIG. 2) on site, without requiring removal and transport of component 130 to a machining shop. Portable milling tool 200, by way of being temporarily coupled to circumferential face 132 during use, can improve the consistency of milling by human users. Portable milling tool 200 provides an automated single axis mill with handheld control, perhaps with touchscreen functionality, for the precise and repeatable removal of material in a portion of a component 130. Portable milling tool 200 can remove a precise amount of material in an automated fashion that greatly reduces the imprecision, time and costs of a manual process that is not capable of holding exact tolerances needed to machine a stressed or cracked area of, for example, a compressor wheel. Portable milling tool 200 may be fully portable and may be adapted for electric operation for use on a turbomachine deck during an outage.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A portable milling tool for a component including a plurality of dovetail slots therein, each of the plurality of dovetail slots extending at least partially axially relative to a rotation axis of the component, the portable milling tool comprising:
    a mounting plate configured to engage the component;
    a tool-aligning member slidably coupled to the mounting plate and extending along a chordal axis relative to the rotation axis of the component, wherein the tool-aligning member is adjustable along the chordal axis between a first position aligned with a selected one of the plurality of dovetail slots, and a second position aligned with a body of the component; and
    a milling head having a rotation axis extending axially in parallel with the rotation axis of the component from the tool-aligning member to a selected one of the plurality of dovetail slots, such that sliding movement of the tool-aligning member relative to the mounting plate moves the milling head along the chordal axis between the first and second positions to contact at least one sidewall of the selected one of the plurality of dovetail slots.

2. The portable milling tool of claim 1, wherein the component comprises a compressor wheel.

3. The portable milling tool of claim 1, wherein the selected one of the plurality of dovetail slots is shaped to receive a dovetail portion of a blade therein.

4. The portable milling tool of claim 1, wherein the selected one of the plurality of dovetail slots includes a sidewall region where two sidewalls of the selected one of the plurality of dovetail slots intersect at an acute angle, and wherein the chordal axis passes through the sidewall region.

5. The portable milling tool of claim 4, wherein the milling head is configured to form a channel extending along the chordal axis between the dovetail slot and an exterior surface of the component through the sidewall region.

6. The portable milling tool of claim 1, further comprising a brace mechanically interposed between the tool-aligning member and the mounting plate, wherein the brace angularly displaces the tool-aligning member from the mounting plate.

7. The portable milling tool of claim 1, wherein the chordal axis is positioned at an offset distance relative to the rotation axis of the component.

8. The portable milling tool of claim 1, wherein the mounting plate further includes at least one fixture for selectively affixing the mounting plate to the component.

9. The portable milling tool of claim 1, further comprising a grip coupled to the tool-aligning member.

10. A portable milling tool for a component including a plurality of dovetail slots therein, each of the plurality of dovetail slots being extending at least partially axially relative to a rotation axis of the component, the portable milling tool comprising:
    a mounting plate configured to engage the component;
    a brace coupled to the mounting plate and extending along a chordal axis relative to the rotation axis of the component;
    a tool-aligning member slidably coupled to the mounting plate and oriented along the chordal axis relative to the rotation axis of the component, wherein the tool-aligning member is adjustable along the chordal axis between a first position aligned with a selected one of the plurality of dovetail slots, and a second position aligned with a body of the component; and
    a milling head having a rotation axis extending axially in parallel with the rotation axis of the component from the tool-aligning member to the selected one of the plurality of dovetail slots, such that sliding movement of the tool-aligning member relative to the mounting plate moves the milling head along the chordal axis between the first and second positions to contact a sidewall region of the selected one of the plurality of dovetail slots, wherein the sidewall region includes a corner between two sidewalls of the selected one of the plurality of dovetail slots, the two sidewalls intersecting at an acute angle.

11. The portable milling tool of claim 10, further comprising a grip coupled to the tool-aligning member.

12. The portable milling tool of claim 10, wherein the component comprises a compressor wheel.

* * * * *